United States Patent
Eschenbach

[11] Patent Number: 5,836,855
[45] Date of Patent: Nov. 17, 1998

[54] RECUMBENT ELLIPTICAL EXERCISE MACHINE

[76] Inventor: Paul William Eschenbach, 143 Lakeland Ave., Moore, S.C. 29369

[21] Appl. No.: 801,194

[22] Filed: Feb. 18, 1997

[51] Int. Cl.[6] ............................. A63B 69/16; A63B 22/00
[52] U.S. Cl. ................................. 482/57; 482/51; 482/62
[58] Field of Search .............................. 482/51, 52, 53, 482/57, 63, 70, 71, 62, 110

[56] References Cited

U.S. PATENT DOCUMENTS

| | | | |
|---|---|---|---|
| 5,039,088 | 8/1991 | Shifferew | 482/51 |
| 5,356,356 | 10/1994 | Hildebrandt et al. | 482/62 |
| 5,433,680 | 7/1995 | Knudsen | 482/63 |
| 5,518,473 | 5/1996 | Miller | 482/57 |
| 5,529,555 | 6/1996 | Rodgers | 482/57 |
| 5,653,662 | 8/1997 | Rodgers | 482/52 |

*Primary Examiner*—Stephen R. Crow

[57] ABSTRACT

An exercise apparatus is provided for sit down exercise operated in the recumbent position where foot operated pedals follow an oblong pedal path coordinated with arm exercise. The pedals are guided by extended foot supports as part of a linkage system that is coupled to the arm exercise. Pedal motion and arm exercise can be adjusted during operation of the exercise apparatus to exercise different muscles. An alternate application of the pedal and arm exercise motion is offered as a propulsion mechanism coupled to the drive train of a land or amphibious exercise apparatus.

31 Claims, 6 Drawing Sheets

RECUMBENT ELLIPTICAL EXERCISE MACHINE

BACKGROUND OF THE INVENTION

1. Field

The present invention relates to a sit down exercise apparatus operated in a recumbent position where foot operated pedals follow an oblong pedal path. More particularly, the present invention relates to an exercise machine having separately supported pedals for the feet and arm exercise coordinated with motion of the feet.

2. State of the Art

The benefits of regular exercise to improve overall health, appearance and longevity are well documented in the literature. For exercise enthusiasts, the search continues for safe apparatus that provides full body exercise for maximum benefit in minimum time. Furthermore, the aging population tends to favor recumbent forms of exercise that encourage muscle tone.

The sit down exercise cycle is the most commonly used apparatus today to elevate the heart rate and exercise some of the leg muscles. To achieve any significant benefit, however, an extensive amount of time is demanded of the user resulting in boredom. To reduce the time needed to elevate the heart rate and exercise additional muscles, various forms of hand cranks and arm levers have been added to sit-down exercise cycles.

Numerous combinations of levers and cranks to combine exercise for arms and feet can be found. Hex in U.S. Pat. No. 4,645,200 combines arm and foot levers for sit down exercise while Glaser in U.S. Pat. No. 3,727,913 shows reciprocating handle and seat coupled to a foot crank. Yount et al. in U.S. Pat. No. 3,759,512 shows spring loaded arm levers and foot crank while Mester in U.S. Pat. No. 3,966,201 provides independent levers with a foot crank for various sit down exercise. Hooper in U.S. Pat. No. 4,188,030 couples a pair of swing arms to a foot crank with a crank eccentric for sit down exercise having air resistance.

Lucas et al. in U.S. Pat. No. 4,880,225 offer oscillating arm levers coupled to the foot crank by a connecting rod. Dalebout et al. in U.S. Pat. Nos. 4,971,316 and 5,000,444 also shows oscillating swing arms coupled to the foot crank by an offset second crank and connecting rod. Lom in U.S. Pat. No. 4,986,533 offers oscillating arms driven by a slider-crank mechanism coupled to a foot crank.

In recent years, recumbent cycles with or without arm exercise have become popular where the seat of the operator is generally the same height from the floor as the crank axis. Actually, recumbent cycles started appearing over 35 years ago with Aronsohn in U.S. Pat. No. 3,017,180 having simple cranks for both feet and arms. Comfort was addressed by Baldwin in U.S. Pat. No. 4,589,656 adding a plush seat and crank driven air aimed at the operator. Lo in U.S. Pat. No. 4,953,850 added wind drag belt driven by a simple crank and handle bars adjacent to the seat.

Roberts in U.S. Pat. Nos. 5,178,593 and 5,269,736 combines simple crank recumbent exercise and upper body exercise where the operator moves to a prone posture for arm exercise. Pitzen et al. in U.S. Pat. No. 5,114,391 provides a recumbent with independent swing arms and foot pedals each driving an electrical generator. Habing et al. in U.S. Pat. No. 5,580,337 adds seat adjustment during exercise. Bostic et al. in U.S. Pat. No. Des. 353,422 display state of the art swing arm handle and simple crank foot pedal exercise. There remains a need for recumbent exercise that provides more challenging total body coordinated exercise.

Swing arms that support a foot pedal to gain mechanical advantage over a simple crank were first used in velocipedes over 100 years ago as in the home trainer by McClintock in U.S. Pat. No. 359,800. Golding in U.S. Pat. No. 400,204 showed several foot pedal arm curves that were vertically extended to increase the power stroke of a velocipede. Montiglio in U.S. Pat. No. 1,577,585 shows swing arms attached to a crank and horizontal slider to vertically extend the foot stroke of a simple bicycle crank to improve the power stroke. Marc in U.S. Pat. No. 4,193,324 offers a vertical oriented elliptical pedal path using a hypocycloidal gear crank drive again to improve the power stroke of a bicycle.

Yamaguci in U.S. Pat. No. 4,560,182 also vertically extends the pedal curve of a bicycle using a pedal swing arm attached to a gear pair with a crank and slider joint to gain mechanical advantage for the power stroke. Schirrmacher in U.S. Pat. No. 4,561,318 uses a pair of long swing arms to extend the vertical height of the pedal path to power a bicycle. Bortolin in U.S. Pat. No. 4,456,276 brings a modern version of the velocipede from Australia with several pedal swing arm versions having an extended vertical pedal path to improve the power stroke of a bicycle. Broluska in U.S. Pat. No. 2,166,565 devised a linkage crank system that changes a simple crank pedal path to address the dead center problem common with bicycle cranks. A vertically extended foot pedal path is shown by Hwang in U.S. Pat. No. 4,842,269 for sit down cycle exercise where a gear crank climbs a vertically extended gear track.

Pedal swing arms having a simple pivot have been adapted to exercise machines such as Hartmann in U.S. Pat. No. 4,555,109 where a dependent mechanism is used for up and down control in place of a simple crank. Leg only exercise in the recumbent position is shown in Webb in U.S. Pat. No. 5,106,081 where a four-bar linkage double rocker mechanism guides a foot pedal with reciprocating motion. Prince et al. in U.S. Pat. Nos. 5,514,053 and 5,437,587, and Hawkins et al in U.S. Pat. No. 5,514,053 provide horizontal linear foot pedal motion. Habing in U.S. Pat. No. 5,445,583 provides swing arm foot pedals coordinated with seat back movement. Hsieh in U.S. Pat. No. 5,518,482 offers multifunction recumbent exercise with a dual set of swing arms for leg exercise.

Hix in U.S. Pat. Nos. 4,645,200 and 4,949,954 uses simple foot pedal swing arms for sit down exercise having swing arm handles where the swing arms are coupled by belt means. Recumbent arm and foot swing levers are coordinated or independent in McBride et al in U.S. Pat. No. 5,505,679. Hildebrandt et al. in U.S. Pat. No. 5,356,356 shows arm and foot levers that are connected to each other for contralateral movement. Sleamaker in U.S. Pat. No. 5,354,251 provides a multifunction unit having foot swing arms and cable arm exercise.

There is a need for a recumbent cycle that has an oblong inclined pedal path configured to better utilize the range of leg and foot motion possible with recumbent exercise for enhanced leg exercise than is possible with a simple bicycle crank. There is a further need for extended closed loop hand path arm exercise that is coordinated with extended foot pedal path exercise for total body exercise.

SUMMARY OF THE INVENTION

The present invention relates to the kinematic motion control of pedals which provide extended leg exercise for recumbent exercise. More particularly, apparatus is provided that offers variable intensity exercise through leg operated cyclic motion in which the pedal supporting each foot is guided through successive positions during the motion cycle while a load resistance acts upon the mechanism. Linkage is provided to coordinate arm exercise with the foot pedals or for separate arm exercise only. A seat is provided adjustably supported by the framework to locate the operator in a generally recumbent position.

The pedals are guided through an oblong or elongate curve motion during operation by a seated operator in a recumbent position. The generally elliptical pedal curve is inclined towards the operator to maintain the leg force tangent to the curve during the down stroke to improve energy transfer from the leg muscles to the pedal motion control mechanism. Arm exercise is by arm levers coordinated with the mechanism guiding the foot pedals. An adjustment mechanism is provided to move a pivot or slider guide of the pedal mechanism to change the pedal motion during operation.

In the preferred embodiment, the apparatus includes a separate pedal for each foot, each pedal being extended by a foot support extension member telescoping into a crossarm member which is pivotally connected to a rotary crank and pivotally connected to a rocker arm. The rotary crank completes one full revolution during a pedal cycle and is phased generally opposite the crank for the other pedal through a bearing journal attached to the framework. The rocker arm is pivotally connected to the framework by a movable pivot support. The pedal is attached to the foot support extension member which is adjustably attached to the crossarm whereby the pedal position on the crossarm can change. The crank, crossarm and rocker form a four-bar linkage known in the literature as a crank-rocker mechanism. The elliptical pedal path is generated by a coupler point on the crossarm assembly.

An actuator is pivotally attached to the movable rocker pivot support and the framework. Extension or retraction of the actuator causes the movable rocker pivot to relocate whereby the oblong pedal path is changed in shape and orientation. The changed oblong pedal path gives different motion to the pedals and arm levers to exercise different muscles.

In another embodiment, the rocker arm of the four-bar linkage is replaced by a slider guide pivotally attached to the crossarm to form a slider crank mechanism. The slider guide is constrained to reciprocate in a linear or curved track adjustably secured to the framework. One end of the track is pivoted to the framework while the other end is pivotally attached to an actuator which is pivotally attached to the frame. Activation of the actuator during operation of the exercise apparatus changes the orientation of the pedal path to exercise different muscles.

Arm exercise is by handle levers adjustably attached to the crossarm members. A locking screw allows the handles to be rotated forward or backward as desired by the operator. The handle path is an oblong curve oriented with the major axis generally horizontal. Activation of the actuator changes the location of the handle curve and causes the orientation to more inclined.

In another embodiment, the rocker arm of the four-bar linkage is replaced by a second crank having a second bearing housing attached to the framework. The second crank pin is connected to the crossarm member by a slide track attached to the crossarm member. The first and second cranks are coupled by chain or timing belts and equal diameter sprockets so that the cranks remain parallel during rotation. The bearing housing of one of the cranks is movably attached to the framework to change the pedal path.

Arm exercise is by handle levers adjustably attached to the crossarm members. A locking screw allows the handles to be rotated forward or backward as desired by the operator. The handle path is a bent oblong curve oriented with the minor axis generally vertical. Activation of the actuator changes the location of the handle curve and the orientation to more inclined.

Load resistance acts upon a flywheel by the adjustment of a pair of disc brake pads for each embodiment. The flywheel is coupled to the crank by chain or timing belt and two or more sprockets. In each embodiment, the flywheel must overcome the frictional force provided by the disc pads on either side of the flywheel. Adjustment of the pad forces upon the flywheel provides variable intensity exercise for the operator. It is understood that other forms of load resistance such as magnetic, alternator, fan, etc., can be coupled to a crank with a flywheel means to provide variable intensity exercise.

While the operator is shown seated in the recumbent position in these embodiments, it must be understood that the operator can be seated in other positions and still enjoy the exercise benefits of the present position.

Another variation of the present invention, uses the elliptical pedal motion as a propulsion drive for a land or amphibious vehicle.

In summary, this invention provides the operator with coordinated recumbent exercise of both the hands and feet through extended motions without joint impact.

DETAILED DESCRIPTION OF THE EMBODIMENTS

Figure 1:
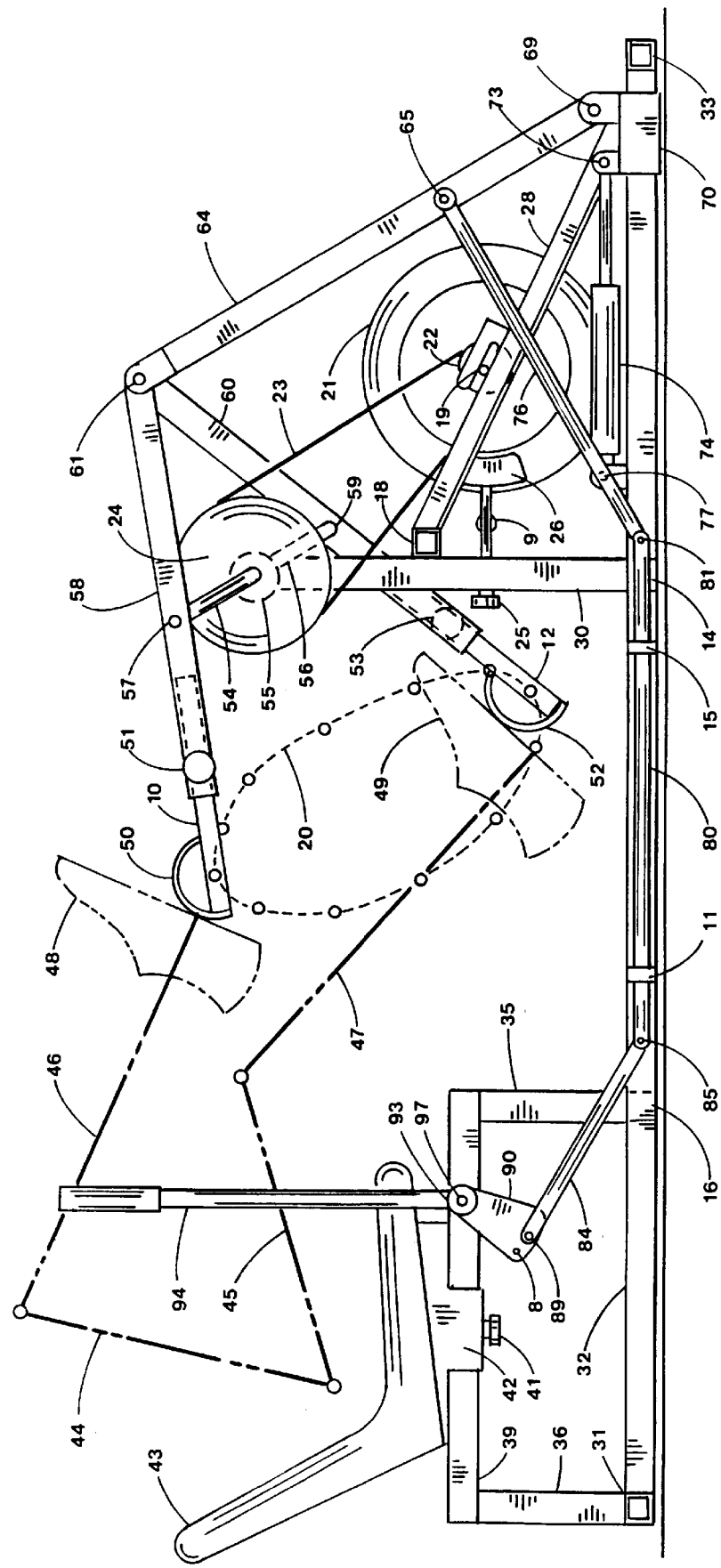
FIG. 1 is a right side elevation view of the preferred embodiment of an exercise machine constructed in accordance with the present invention.
Figure 2:
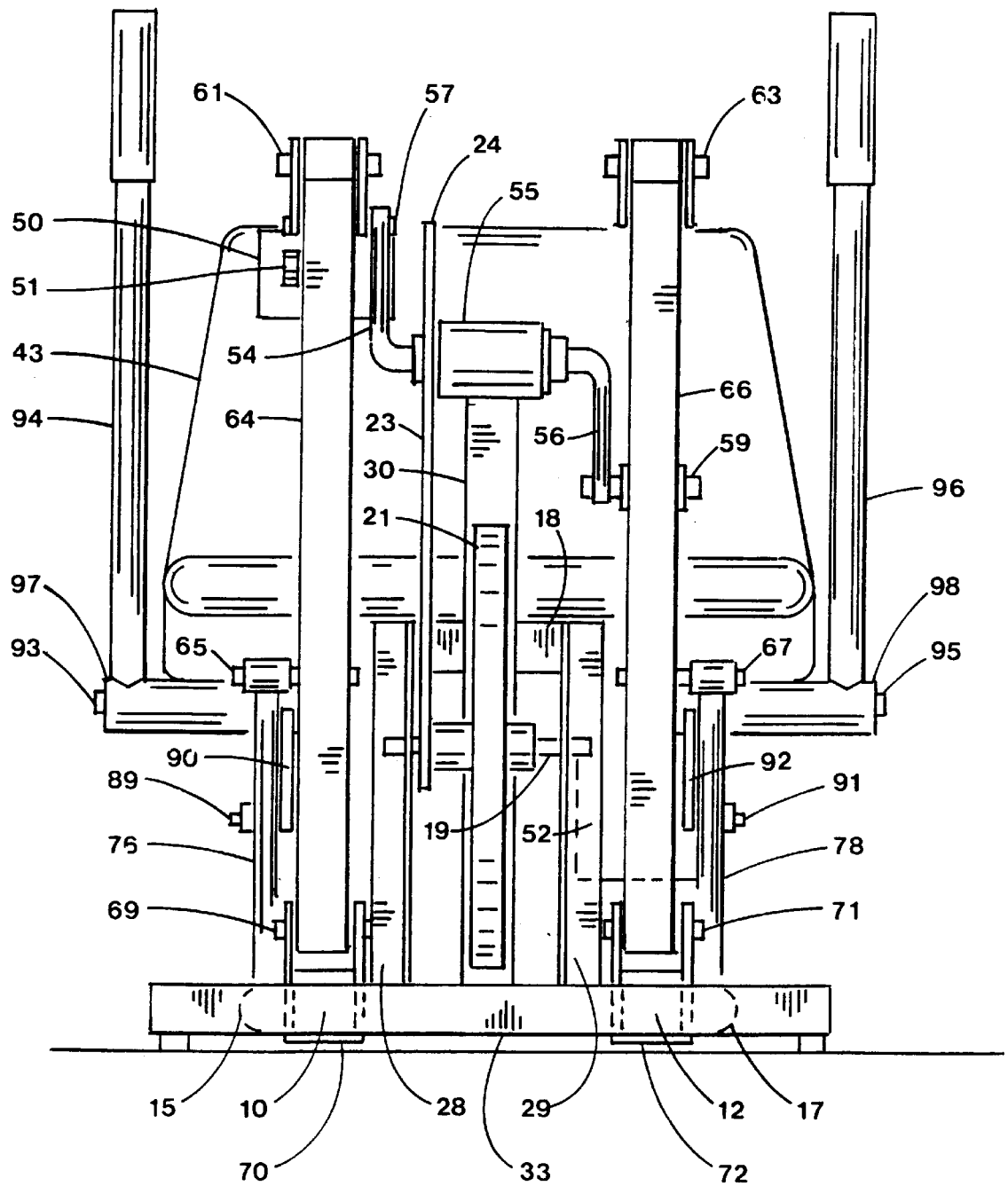
FIG. 2 is the front view of the preferred embodiment shown in FIG. 1.

Referring to the drawings in detail, pedals 50 and 52 are shown in FIGS. 1 and 2 in their uppermost and lowermost positions of the preferred embodiment. Pedals 50 and 52 are attached to pedal extensions 10 and 12 which telescope into crossarms 58 and 60 being secured to the crossarms 58 and 60 by locking screws 51 and 53. Extensions of the pedals 50 and 52 allow a different pedal path curve 20. The crossarms 58 and 60 are supported by crank pins 57 and 59 and rocker pivots 61 and 63. Cranks 54 and 56 having crank pins 57 and 59, are connected in opposing directions by crankshaft journal (not shown) which is rotatably secured to frame support 30 by bearing housing 55. Rocker arms 64 and 66 are connected to crossarms 58 and 60 at rocker pivots 61 and 63 and to movable rocker pivot supports 73 and 75 by pivots 69 and 71. Movable rocker pivot supports 73 and 75 are mounted to frame supports 32 and 34 as slides and to actuators 74 and 75 which are pivotally attached to frame supports 32 and 34. The actuators 74 and 75 can be used during operation in synchronous or independently to relocate the rocker pivots 69 and 71 which changes the pedal path 20.

The frame support members 32 and 34 are configured to be supported by the floor and are connected by cross members 31,16,14 and 33. Upright support 30 is connected to cross member 14 and support member 18. Inclined supports 28 and 29 are attached to support member 18 and cross member 33. Upright support members 36 and 38 are attached to cross member 31 and seat supports 39 and 40. Upright supports 35 and 37 are attached to cross member 16 and seat supports 39 and 40. Seat 43 is attached to seat supports 39 and 40 by slide bracket 42 and locking screw 41 whereby the location of seat 43 is adjustable.

Arm exercise occurs with handles 94 and 96 which are connected by pivots 93 and 95 to handle extensions 97 and 98 which are connected to seat supports 39 and 40. Arm brackets 90 and 92 are attached to handles 94 and 96, and have several locations for pivots 89 and 91 for links 84 and 86. Links 80 and 82 are supported by slides 11 and 13, and 15 and 17 which are supported by frame supports 32 and 34. Pivots 85 and 87 connect links 80 and 82 to links 84 and 86 and pivots 81 and 83 connect links 80 and 82 to links 76 and 78 which are attached to rocker arms 64 and 66 by pivots 65 and 67. A rearward force on arm handle 94 or 96 causes a forward force on rocker 64 or 66 in synchronous with the forward force of pedal 50 or 52.

Adjustable load resistance is provided by disc pads 26 and 27 acting upon flywheel 21 by adjustment mechanism 5 and handle 25 which is rotatably attached to support 30. Flywheel 21 is rotatably attached to supports 28 and 29 by axle shaft 19. Sprocket 22 is attached to flywheel 21 and coupled to sprocket 24 by chain 23. Sprocket 24 is attached to rotate with crank 54.

Application of upper leg 44 and 45, and lower leg 46 and 47 force through feet 48 and 49 acting upon pedals 50 and 52 move the pedals through elliptical path 20 to drive cranks 54 and 56 adding momentum to flywheel 21. This flywheel 21 momentum will carry the linkage system through any dead center positions of cranks 54 and 56. The pedals 50 and 52 and arm handles 94 and 96 can be operated together or independently to drive flywheel 21 in either direction of rotation.

Figure 3:
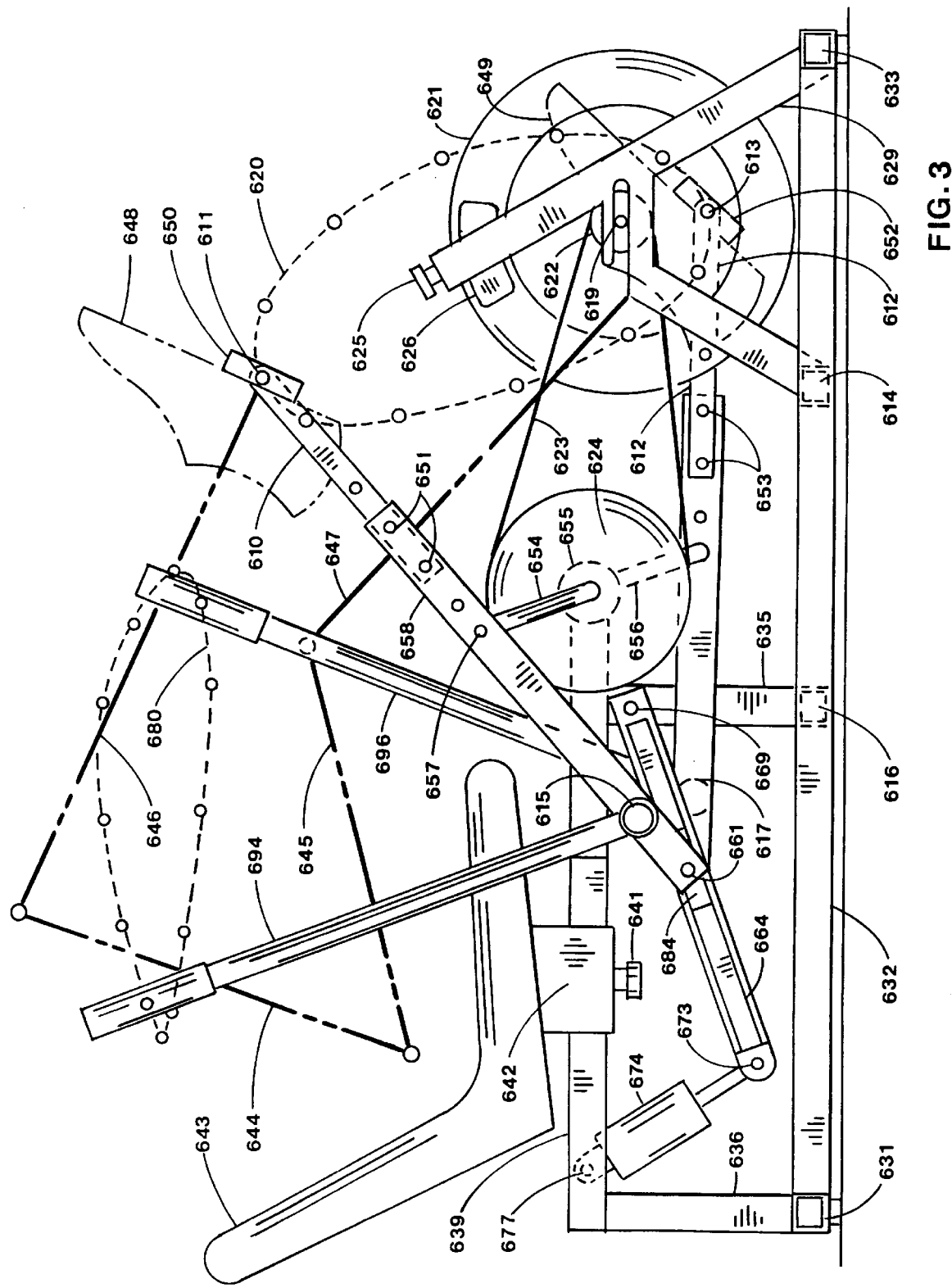
FIG. 3 is a right side elevation of the second embodiment of the present invention.
Figure 4:
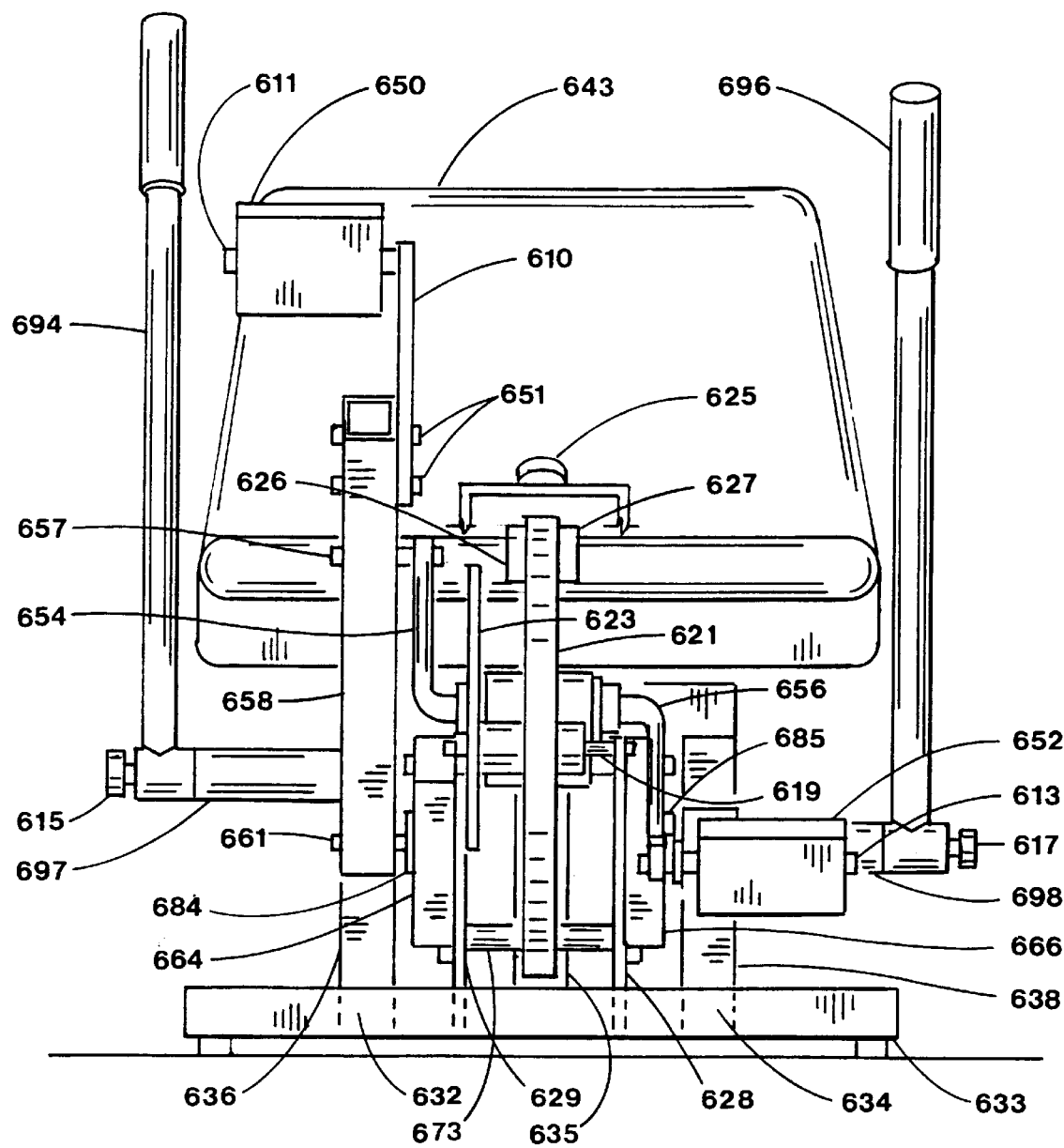
FIG. 4 is the front view of the second embodiment shown in FIG. 3.

Another embodiment of the present invention is shown in FIGS. 3 and 4 where pedals 650 and 652 are shown in their uppermost and lowermost positions of the second embodiment. Pedals 650 and 652 are attached to pedal extensions 610 and 612 which telescope into crossarms 658 and 660 being secured to the crossarms 658 and 660 by locking screws 651 and 653. Extensions of the pedals 650 and 652 allow a different pedal path curve 620. The crossarms 658 and 660 are supported by crank pins 657 and 659 and slider pivots 661 and 663.

Cranks 654 and 656 having crank pins 657 and 659, are connected in opposing directions by crankshaft journal (not shown) which is rotatably secured to frame support 637 by bearing housing 655. Sliders 684 and 685 are connected to crossarms 658 and 660 by pivots 661 and 663 and constrained to reciprocate in tracks 664 and 666 which are attached to frame support 635 by pivot 669 on one end and attached to actuator 674 by pivot 673.

Actuator 674 is attached to frame supports 639 and 640 by pivot 677. The actuator 674 can be activated to swing tracks 664 and 666 about pivot 669 to change the pedal path 620 during operation of the exercise apparatus. Double actuators can be used to give independent pedal adjustment for each foot path.

Frame support members 632 and 634 are configured to be supported by the floor and are connected by cross members 631, 616, 614 and 633. Seat supports 639, 640 and 637 are supported by upright supports 636, 638 and 635 which are attached to cross members 631 and 616. Seat 643 is attached to supports 639 and 640 by slide bracket 642 and locking screw 641.

Arm exercise occurs with handles 694 and 696 which are adjustably connected to arm extensions 697 and 698 by locking screws 615 and 617. Arm extensions 697 and 698 are attached to crossarms 658 and 660. The hands follow elongate curve 680 while the pedals 650 and 652 follow a generally elliptical curve 620. A forward hand force on handle 694 acts with a down and forward force upon pedal 650 to rotate crank 654 while a rearward force on handle 696 acts to rotate crank 656 to lift pedal 652.

Adjustable load resistance is provided by disc pads 626 and 627 acting upon flywheel 621 by adjustment mechanism 605 and handle 625 which is rotatably attached to support 604. Flywheel 621 is rotatably attached to supports 628 and 629 by axle shaft 619. Sprocket 622 is attached to flywheel 621 and coupled to sprocket 624 by chain 623. Sprocket 624 is attached to rotate with crank 654.

Application of upper leg 644 and 645, and lower leg 646 and 647 force through feet 648 and 649 acting upon pedals 650 and 652 move the pedals through elliptical path 620 to drive cranks 654 and 656 adding momentum to flywheel 621. This flywheel 621 momentum will carry the linkage system through any dead center positions of cranks 654 and 656. The pedals 650 and 652 and arm handles 694 and 696 can be operated together or independently to drive flywheel 621 in either direction of rotation.

Figure 5:
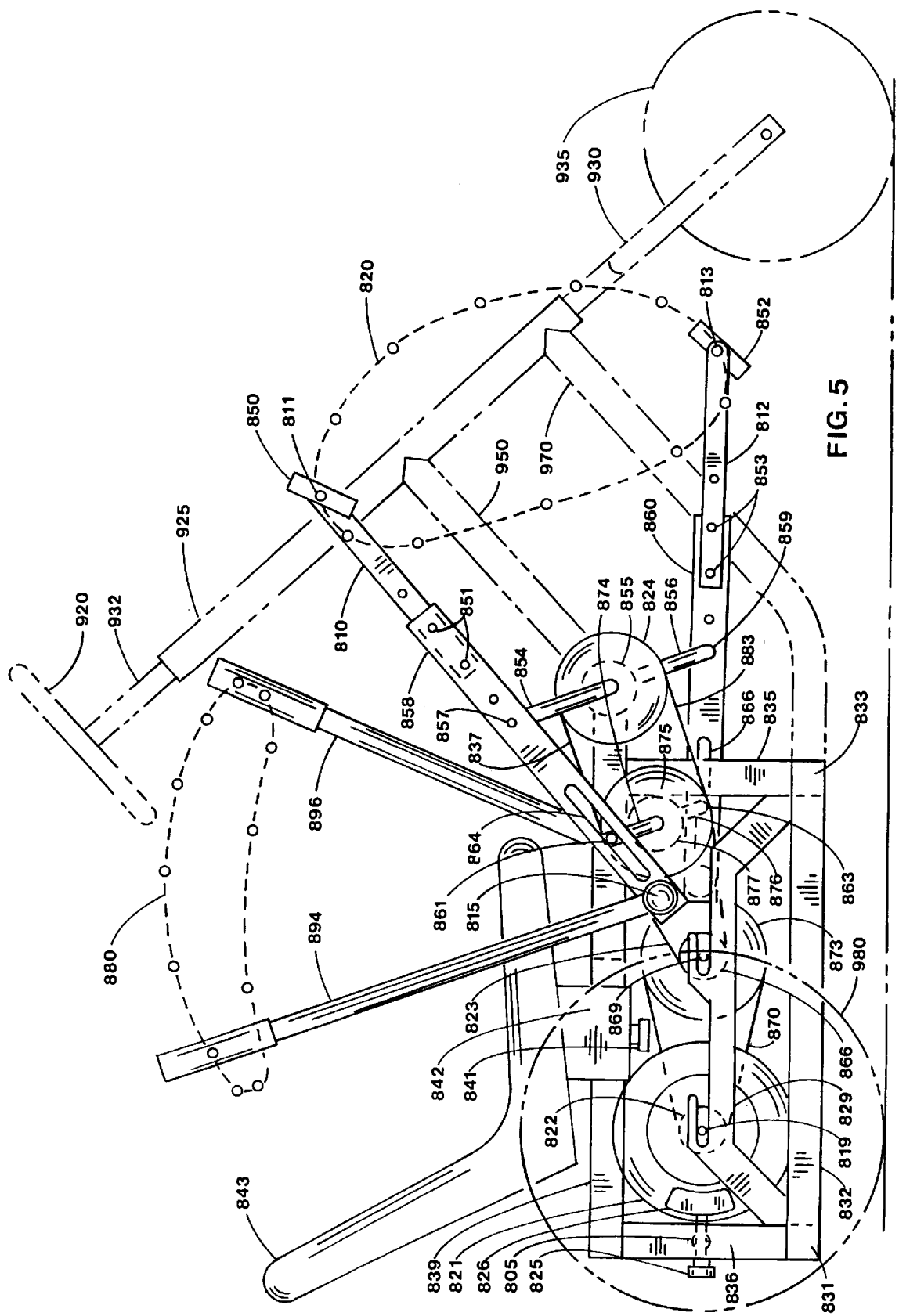
FIG. 5 is a right side elevation of the third embodiment of the present invention.
Figure 6:
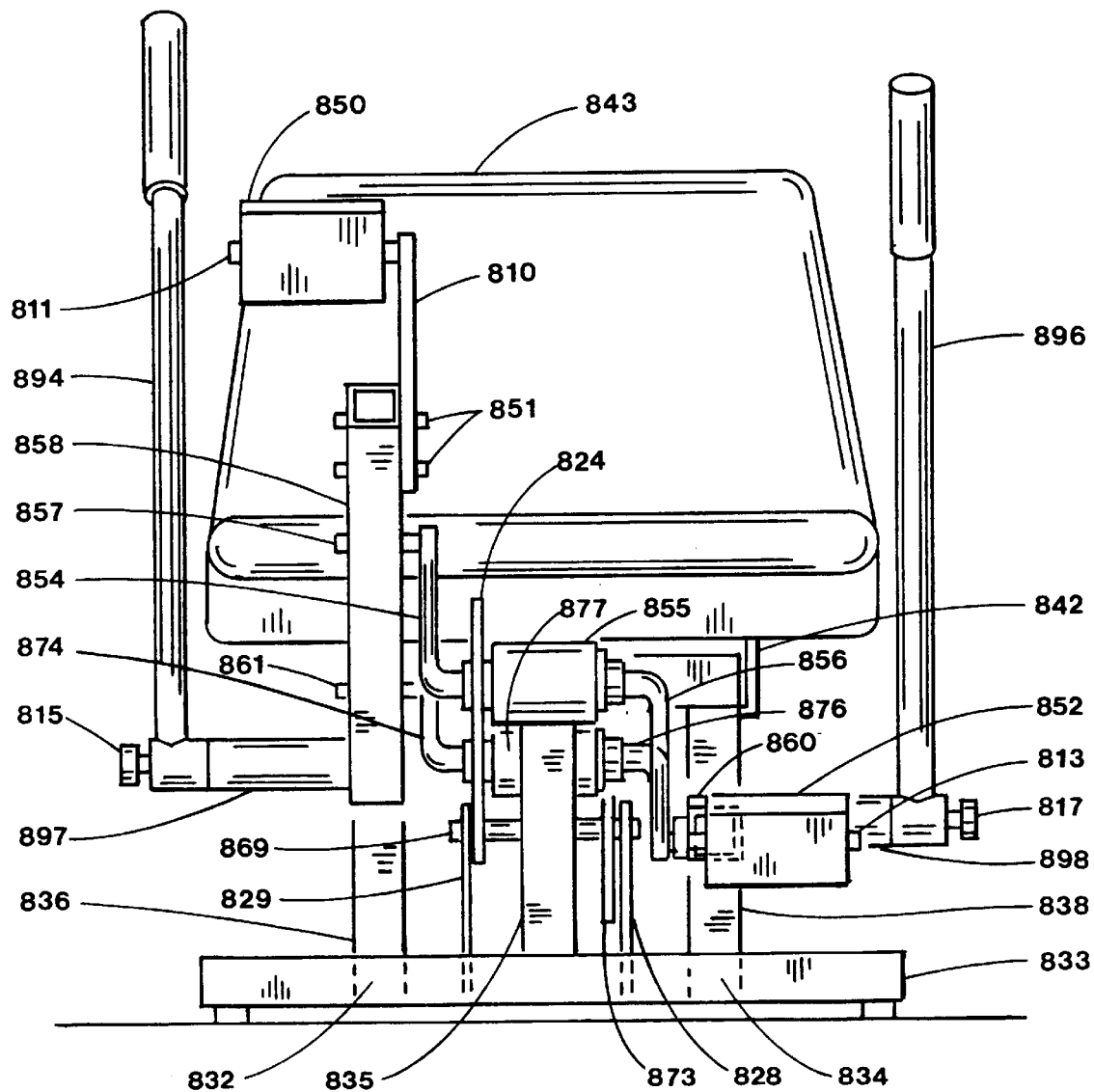
FIG. 6 is the front view of the third embodiment shown in FIG. 5.

Another embodiment of the present invention is shown in FIGS. 5 and 6 where pedals 850 and 852 are shown in their uppermost and lowermost positions of the third embodiment. Pedals 850 and 852 are attached to pedal extensions 810 and 812 which telescope into crossarms 858 and 860 being secured to the crossarms 858 and 860 by locking screws 851 and 853. Extensions of the pedals 850 and 852 allow a different pedal curve 820.

The crossarms 858 and 860 are supported by crank pins 857 and 859 which are connected to a first pair of cranks 854 and 856, and crank pins 861 and 863 which are attached to a second pair of cranks 874 and 876 with slots 864 and 866. The first pair of cranks 854 and 856 are connected in opposing directions by a crankshaft journal (not shown) which is rotatably secured to frame support 837 by bearing housing 855. The second pair of cranks 874 and 876 are connected in opposing directions by a crankshaft journal (not shown) which is rotatably secured to frame support 835 by movable bearing housing 877.

Frame support members 832 and 834 are configured to be supported by the floor and are connected by cross members 831 and 833. Seat supports 839 and 840 are supported by upright supports 836, 838 and 835 which are attached to cross members 831 and 833. Seat 843 is attached to supports 839 and 840 by slide bracket 842 and locking screw 841.

Arm exercise occurs with handles 894 and 896 which are adjustably connected to arm extensions 897 and 898 by locking screws 815 and 817. Arm extensions 897 and 898 are attached to crossarms 858 and 860. The hands follow a bent oblong path 880 while the pedals 850 and 852 follow a generally elliptical curve 820. A forward hand force on handle 894 acts with a down and forward force upon pedal 850 to rotate crank 854 while a rearward force on handle 896 acts to rotate crank 856 to lift pedal 852.

Adjustable load resistance is provided by disc pads 826 and 827 acting upon flywheel 821 by adjustment mechanism 805 and handle 825 which is rotatably attached to support 836. Flywheel 821 is rotatably attached to supports 828 and 829 by axle shaft 819. Sprocket 822 is attached to flywheel 821 and coupled to sprocket 873 by chain 870. Sprocket 873 is attached to rotate with sprocket 866 about jackshaft 869 which is attached to supports 829 and 828. Sprocket 866 is coupled to sprocket 863 which is attached to crank 874 and to sprocket 824 which is attached to crank 854 whereby the cranks rotate with parallel motion.

Application of upper leg and lower leg force through the feet acting upon pedals 850 and 852 move the pedals through elliptical path 820 to drive cranks 854 and 856 adding momentum to flywheel 821. This flywheel 821 momentum will carry the linkage system through any dead center positions of cranks 854 and 856. The pedals 850 and 852 and arm handles 894 and 896 can be operated together or independently to drive flywheel 821 in either direction of rotation.

Adaptation of the elliptical pedal foot motion and/or elongated closed loop arm motion to a land vehicle is shown in FIGS. 5 and 6 with the addition of rear wheels 980 and 982 supported by axle 819 and a front wheel 935 supported by fork 930. Fork 930 is attached to one end of steering shaft 932 with the steering wheel 920 connected to the other end. Steering housing 925 is rotatably attached to steering shaft 932 and supported by frame members 950 and 970.

Frame member 950 is attached to bearing housing 855 and frame member 970 is attached to frame member 833. Handles 894 and 896 are optional during vehicle movement. For an amphibious vehicle, the rear wheels would also function as paddle wheels and the front wheel as a rudder with a hull attached to frame members 832 and 834.

What is claimed is:

1. An exercise machine comprising:
    a framework means, said framework means configured to be supported by the floor and support a seat means;
    a pedal means, said pedal means configured for each foot of a seated operator;
    a linkage means having first and second ends and having a crank means connected intermediate said ends and projecting outwardly therefrom on both sides thereof, said crank means rotatably connected to said framework means;
    a coupling means operably associated with said linkage means and said first end and said framework means;
    said pedal means connected to each said linkage means at a second end of said linkage means whereby said pedal means follows a generally elliptical inclined pedal path as said crank means rotates with the foot force acting upon said pedal means of a seated operator positioned in said seat means.

2. The exercise machine according to claim 1 wherein said coupling means is a rocker arm means pivotally connected to said linkage means on one end and pivotally connected to said framework means on the other end.

3. The exercise machine according to claim 1 wherein said coupling means is a slider means pivotally connected to said linkage means and constrained to move with reciprocating motion by a linear track means connected to said framework means.

4. The exercise machine according to claim 1 wherein said coupling means is a second crank means pivotally connected to said linkage means on one end and rotatably associated with said framework means on the other end, said second crank means being operably associated with said first crank means by a belt and equal diameter sprockets.

5. The exercise machine according to claim 1 further comprising an actuator means connected to said coupling means on one end and operably associated with the framework on the other whereby said coupling means connection to said framework means can be moved during operation of said exercise machine thereby causing said elliptical inclined pedal path to change.

6. The exercise machine according to claim 1 further comprising a pedal adjustment means wherein said pedal means is connected to said linkage means with a locking means whereby said locking means can be released to reposition the pedal means relative to said linkage means thereby causing said elliptical inclined pedal path to change.

7. The exercise machine according to claim 1 further comprising a load resistance means operably associated with said crank means.

8. The exercise machine according to claim 1 further comprising a flywheel means operably associated with said crank means.

9. The exercise machine according to claim 1 further comprising an adjustment means whereby said seat means can be moved relative to said framework means.

10. The exercise machine according to claim 1 further comprising arm exercise means operably associated with said linkage means.

11. The exercise machine according to claim 1 further comprising arm exercise means wherein said arm exercise means comprises a handle means pivotally connected to said framework means and a coupler link means pivotally connected to said handle means and pivotally connected to said coupling means.

12. A recumbent exercise machine comprising:
    a framework means, said framework means configured to be supported by the floor and support a seat means;
    a pedal means, said pedal means configured for each foot of a recumbent operator;
    a linkage means having a crank means projecting outwardly therefrom on both sides thereof, said crank means rotatably connected to said framework means;
    a coupling means operably associated with said linkage means and said framework means;
    said pedal means connected to each said linkage means whereby said pedal means follows a generally oblong inclined pedal path as said crank means rotates with the foot force acting upon said pedal means of a recumbent operator positioned in said seat means;
    an actuator means connected to said coupling means on one end and operably associated with the framework on the other whereby the coupling means connection to said framework means can be moved during operation of said exercise machine thereby causing said oblong inclined pedal path to change.

13. The recumbent exercise machine according to claim 12 wherein said coupling means is a rocker arm means pivotally connected to said linkage means on one end and pivotally connected to said actuator means on the other end.

14. The recumbent exercise machine according to claim 12 wherein said coupling means is a slider means pivotally connected to said linkage means and constrained to move with reciprocating motion by a curved or linear track means connected to said actuator means.

15. The recumbent exercise machine according to claim 12 wherein said coupling means is a second crank means pivotally connected to said linkage means on one end and rotatably associated with said actuator means on the other end, said second crank means being operably associated with said first crank means by a belt and equal diameter sprockets.

16. The recumbent exercise machine according to claim 12 further comprising arm exercise means operably associated with said linkage means.

17. The recumbent exercise machine according to claim 12 further comprising a pedal adjustment means wherein said pedal means is connected to said linkage means with a locking means whereby said locking means can be released to reposition the pedal means with said pedal adjustment means relative to said linkage means thereby causing said oblong inclined pedal path to change.

18. A recumbent exercise machine comprising:

a framework means, said framework means configured to be supported by the floor and support a seat means;

a crankshaft bearing housing means connected to said framework means and having a crank means projecting outwardly therefrom on both sides thereof;

a crossarm means having first and second ends, said crossarm means having a first crossarm pivot means intermediate said ends and connected to each said crank means and a second crossarm pivot means connected to a pivot guide means at one of said ends and operably associated with said framework means;

a pedal means connected to each said crossarm means at said other end whereby said pedal means follows a generally elliptical pedal path as said crank means rotates with the foot force acting upon said pedal means of a recumbent operator positioned in said seat means, said foot force acting generally tangent to uppermost portion of said elliptical pedal path.

19. The recumbent exercise machine according to claim 18 wherein said pivot guide means is a rocker arm means pivotally connected to said second crossarm pivot means on one end and pivotally connected to said framework means on the other end.

20. The recumbent exercise machine according to claim 18 wherein said pivot guide means is a slider means pivotally connected to said second crossarm pivot means and constrained to move with reciprocating motion by a linear track means connected to said framework means.

21. The recumbent exercise machine according to claim 18 wherein said pivot guide means is a second crank means pivotally connected to said second pivot crossarm means on one end and rotatably associated with said framework means on the other end, said second crank means being operably associated with said first crank means by a belt and equal diameter sprockets.

22. The recumbent exercise machine according to claim 18 further comprising an actuator means connected to the pivot guide means on one end and operably associated with the framework on the other whereby the pivot guide means connection to said framework means can be moved during operation of said exercise machine thereby causing said elliptical pedal path to change.

23. The recumbent exercise machine according to claim 18 further comprising a pedal adjustment means wherein said pedal means is connected to said crossarm means with a locking means whereby said locking means can be released to reposition the pedal means relative to said crossarm means thereby causing said elliptical pedal path to change.

24. The recumbent exercise machine according to claim 18 further comprising arm exercise operably associated with said pivot guide means or said linkage means.

25. An exercise machine comprising:

a framework means, said framework means configured to be supported by the floor and support a seat means;

a handle means, said handle means configured for each hand of a seated operator;

a linkage means having a crank means projecting outwardly therefrom on both sides thereof, said crank means rotatably connected to said framework means;

a coupling means operably associated with said linkage means and said framework means;

said handle means connected to each said linkage means whereby said handle means follows an extended closed loop hand path as said crank means rotates with the hand force acting upon said handle means of an operator positioned in said seat means; and an actuator means connected to said coupling means on one end and operably associated with the framework on the other end, whereby said coupling means connection can be moved during operation of said exercise machine thereby causing said elongated closed loop hand path to change.

26. The exercise machine according to claim 25 wherein said coupling means is a rocker arm means pivotally connected to said linkage means on one end and pivotally connected to said framework means on the other end.

27. The exercise machine according to claim 25 wherein said coupling means is a slider means pivotally connected to said linkage means and constrained to move with reciprocating motion by a curved or linear track means connected to said framework means.

28. The exercise machine according to claim 25 wherein said coupling means is a second crank means pivotally connected to said linkage means on one end and rotatably associated with said framework means on the other end, said second crank means being operably associated with said first crank means by a belt and equal diameter sprockets.

29. The exercise machine according to claim 25 further comprising a pedal means operably associated with said linkage means.

30. The exercise machine according to claim 25 further comprising a load resistance means and flywheel means operably associated with said crank means.

31. The exercise machine according to claim 25 further comprising an adjustment means whereby said seat means can be moved relative to said framework means.

* * * * *